2,830,903

IRISH MOSS

Lyle H. Berndt, Libertyville, Ill., and Ralph A. Klein, Liverpool, N. Y., assignors to National Dairy Products Corporation, a corporation of Delaware No Drawing. Application July 22, 1954
Serial No. 445,200

4 Claims. (Cl. 99—25)

The present invention relates generally to an improved Irish moss extract and, more particularly, it relates to improvements in the process for making a chocolate flavored milk drink and to the product of this process.

There are two principal commercial processes for making chocolate flavored milk drinks, one being known as the "hot process" and the other being known as the "cold process." The hot process, which is most common, is a process which involves dispersing suitable amounts of cocoa powder and sugar in milk at a relatively high temperature, i. e., from about 140° F. to 160° F. Typically, the drink comprises about 1 percent of cocoa powder and sufficient sugar to provide the desired sweetening. In order to prevent the cocoa powder from settling out, a suspending agent, such as an Irish moss extract, is used. Through the use of such a process, a highly satisfactory product is provided, which product can have a homogeneous body and uniform appearance.

However, some chocolate flavored milk drink manufacturers do not have the facilities for heating large or even relatively small quantities of milk and, as a consequence, are not able to use the hot process. Accordingly, many small manufacturers employ the cold process, in which process the cocoa powder and sugar are made into a relatively thick syrup which is then stirred directly into milk at a temperature usually below about 60° F. A suspending agent is combined with the syrup to prevent settling of the flavoring material. However, increased amounts of suspending agent are required to maintain the suspension and even with increased amounts, satisfactory suspension is not always provided.

The present invention is primarily directed to the cold process which, as above indicated, involves different problems than encountered in the hot process. A principal problem with the cold process for preparing chocolate flavored milk drink arises from the formation of a serum-like layer on top of the milk, generally referred to as layering, after the prepared drink has been allowed to stand. This layering is believed to be caused by partial precipitation of the milk protein, leaving a layer on top of the chocolate layer which is protein deficient. The presence of the layer gives the product a non-uniform appearance which detracts from the marketability of the product.

We have now discovered that the tendency of chocolate flavored milk drinks produced by the cold process to form such serum-like layers can be eliminated by the addition of a suspending agent comprising a particular Irish moss extract in certain critical amounts, the extract having a viscosity within a specific range and a particular gel strength. Accordingly, the present invention is also directed to this new extract.

Extract is prepared from Irish moss which is a sea plant known by the botanical names of *Chrondrus crispus* or *Gigartina mamillus* and more commonly as Carragheen, Perl moss, rock salt moss, and killeen pigwrack. Irish moss is harvested in this country along the northeastern seaboard and also along the coast of the British Isles, Northern Europe, and Nova Scotia. Extracts of Irish moss have been used for many years in the preparation of pharmaceutical and food products.

Extract is manufactured by leaching the useful materials from the moss with hot water, the leaching water then being separated from the solid residue and evaporated to form an extract.

The physical properties such as viscosity and gel strength of Irish moss vary considerably, depending upon the source of the moss, the treatment which the moss undergoes in recovering the extract, etc. With identical treatments, the physical characteristics of Irish moss, such as viscosity, gel strength, and suspending strength, may vary widely from season to season, even where the moss is harvested from the same source.

An object of the present invention is to provide an Irish moss extract from practically any Irish moss, which extract can be used for preventing the characteristic layering of chocolate flavored milk drinks when made by the cold process.

Still another object of the invention is to provide an improved stabilized chocolate milk drink.

We have discovered that practically any Irish moss which provides an extract having a characteristically high viscosity, when prepared by the heretofore known leaching process, can be treated so as to give an extract which, when used in carefully controlled amounts, overcomes the difficulties previously associated with the stabilization of chocolate flavored milk drinks produced by the cold process. Our invention involves adding to the syrup, employed in the manufacture of chocolate drinks by the cold process, a mildly acid hydrolyzed Irish moss extract prepared in such manner that it has a Brookfield viscosity in the range from about 60 to about 200 centipoises in a 1 percent water solution at 98° F., the amount of such extract added being within the range from about 0.075 to 0.085 percent based upon the weight of the milk. The gel strength of the extract should be less than 50 grams per square centimeter at 50° F. (measured by a modified Saare-Martens disk method).

Numerous techniques have been developed to reduce the viscosity of Irish moss extracts but we have found, that to manufacture the extract of the invention, the Irish moss must be treated with acid to reduce its viscosity. We use a medium or mild acid hydrolysis of the moss during extraction to reduce the viscosity of the resulting Irish moss extract from the usual range of from 300 to 600 centipoises into the range of 60 to 200 centipoises.

The reduction of viscosity by acid hydrolysis has been avoided in the past because it was thought that degradation of the moss occurred by acid treatment. We have discovered, however, that the effect of limited acid treatment, contrary to the teachings of the art, provides an extract having highly desired properties. It is difficult to determine the effect of acid treatment upon the extract but it is important that the viscosiy be reduced in this manner. In other words, we do not know whether degradation occurs nor do we know the nature of the change except that reduction of viscosity by mild acid hydrolysis provides an extract having unusual properties.

It is important that the moss which is treated provide an extract, when treated by normal leaching procedures, having a viscosity in a 1 percent dispersion at 98° F. of between about 300 and about 600 centipoises. If the viscosity of such extract is higher than about 600 centipoises, excessive hydrolysis is required to reduce the viscosity to the desired range, while, on the other hand, if such viscosity is lower than about 300 centipoises, sufficient acid treatment is not generally possible while providing an extract within the range desired.

In reducing the viscosity of Irish moss extracts to the range indicated we hydrolyze the moss during extraction with an acid solution, such as hydrochloric acid and sulfuric acid solutions, having a pH in the range from about 3.5 to 5.5. This type of hydrolysis is conveniently carried out by boiling the moss in the acid solution for periods of time from about fifteen minutes to one hour, depending in part upon the character of the moss. After acid treatment, the solution is neutralized, preferably with sodium carbonate. This type of treatment is effective to produce an extract having the desired viscosity from moss which normally provides an extract having a viscosity of 300 to 600 centipoises.

The factors of viscosity, gel strength, and quantity are interrelated in using the extract of the invention in the cold process. Extracts having a Brookfield viscosity of less than 60 centipoises, in a 1 percent solution at 98° F., do not have the ability to prevent layering and settling, even when used in relatively high concentrations. Similarly, the use of extracts having viscosity in excess of 200 centipoises should be avoided even in low concentrations because they tend to set up or gel the milk to form gelatinous masses which are quite unpalatable.

Some mosses have an extremely high gel strength, even though the viscosity may be within the desired range. The high gel strength of such extracts makes it difficult to combine with cocoa and sugar in forming the syrup to be added to the cold milk. In such cases we prefer to pretreat the moss with a sodium salt such as sodium chloride before the treatment with acid. This type of pretreatment has been described in Nielsen and Pellicani, United States Patent No. 2,620,334, issued December 2, 1952, and assigned to the assignee of this invention. As before noted, the gel strength should be below 50 grams per square centimeter as determined by a modified Saare-Martens disk method.

Briefly, the sodium chloride pretreatment involves soaking dried Irish moss, either in the bleached or unbleached condition, for periods upwards of 15 minutes in an aqueous solution containing more sodium ion than that provided in a sodium chloride solution containing .5 percent salt, and then draining the salt solution from the moss. Following this pretreatment, if used, the drained moss is then cooked with the acid solution of the proper pH. The fibrous materials are then separated from the liquid and the liquid is evaporated to produce the extract. Since the pretreatment with sodium salts raises the viscosity, it is usually desirable to employ a somewhat stronger acid solution when using the pretreatment than would be necessary without the pretreatment.

In determining whether the desired gel strength has been achieved, the modified Saare-Martens disk method is followed, the method comprising preparing a 2 percent aqueous dispersion, by weight, of extract. The aqueous dispersion is heated to from 175° F. to 185° F. and poured into a wide mouthed container such as a beaker. A test surface having an area of one square centimeter and having a supporting hook attached thereto, is suspended in the dispersion. The dispersion in the container is then cooled and aged for about 12 hours. The container is then placed in a water bath held at 50° F. for one hour to temper the gel. The gel strength is then measured by the least number of grams required to break the test surface free from its position in the gel.

Extract produced according to the process of the invention is added to cocoa powder and sugar in the formation of syrup to be added to milk in the cold process. The extract produced according to the above described process is quite compatible with the other ingredients and produces a smooth syrup which can be incorporated into milk having a temperature of 60° F. or below.

The following specific example illustrates one manner in which the process of the present invention may be carried out.

*Example*

Specimens of Irish moss which has been previously air dried, without bleaching, to produce the "black moss" of commerce were passed through a hammer mill which comminuted the particles to about 10 to 20 mesh. The comminuted particles were then passed over a screen to remove foreign matter which is normally present in the moss as harvested. This moss would normally produce an extract having, in a 1 precent dispersion, a viscosity of 350 centipoises when measured at 98° F. on a Brookfield viscosimeter and a gel strength of about 75 in a 2 percent aqueous dispersion.

A portion of the cleaned moss, weighing about 1.5 pounds, was suspended in 35 pounds of a 1 percent aqueous sodium chloride solution. The moss was soaked in this salt solution for about one hour at a temperature of about 70° F. and at the end of this time the salt solution was drained from the moss. Enough tap water was added to the drained moss to bring the total water content to about 50 pounds. Enough hydrochloric acid was added to the water to bring the pH of the solution to about 5.0. The acidified mixture of moss and water was rapidly heated to about 210° F. and then cooked for about 45 minutes at a temperature between about 200° F. and 210° F.

At the end of the cooking period, about 3.5 pounds of diatomaceous earth filter aid was added to the cooked mixture. The mixture was then filtered while hot in a plate and frame filter press. The filtrate was dried on a roll drier to a moisture content of about 6 percent to produce a dried extract. This is an extract of the invention. A 1 gram portion of the extract was dispersed in 99 grams of water to produce a 1 percent aqueous dispersion, the dispersion having a viscosity of about 150 centipoises when measured at 98° F. on a Brookfield viscosimeter. A 2 percent aqueous dispersion was prepared and was found to have a gel strength of 25 grams per square centimeter.

A chocolate syrup was prepared by mixing 5.5 pounds of cocoa powder and 30 pounds of sugar. Water was then added in an amount of 25 pounds and the mixture stirred and cooked at 185° F. for 15 minutes. .38 pound of the treated Irish moss extract was added.

Fifty-eight pounds of syrup was then blended with 500 pounds of milk having a temperature of about 40° F. and produced a stable suspension of cocoa particles in the milk which did not separate into apparent layers upon prolonged standing.

The present invention is applicable to the treatment of a wide variety of mosses. Satisfactory results may be achieved by using a blend of mildly acid hydrolyzed moss extracts, one having a viscosity above the desired range of 60 to 200 centipoises and the other having a viscosity below the stated range, provided the resulting viscosity is in the range indicated. Similarly, blending of mosses may be used to provide the desired gel strength.

Certain modifications can be made to the above-described process without departing from the scope of the present invention, these modifications being within the skill of those familiar with the art.

We claim:

1. The method of making a chocolate flavored milk drink by the cold process which comprises hydrolyzing Irish moss in an acid solution having a pH of 3.5 to 5.5 for a time sufficient to provide an extract having a viscosity in the range from about 60 to about 200 centipoises in a 1 percent water solution at 98° F., and mixing said extract with cocoa powder and sugar to prepare a syrup, blending the syrup with cold milk, said extract being added in an amount from about 0.075 to about 0.085 percent, by weight, of the milk.

2. The method of making an Irish moss extract for suspending chocolate in unheated milk comprising the steps of selecting Irish moss having viscosity characteristics such that the Irish moss would provide an extract having a viscosity between about 300 centipoises and about 600 centipoises in a 1 percent aqueous dispersion at 98° F. when prepared by aqueous leaching, subjecting said Irish moss to a solution containing an amount of sodium ions greater than that provided by a .5 percent, by weight, aqueous sodium chloride solution to reduce the gel strength below 50, and then subjecting the Irish moss to an acid hydrolysis treatment with a solution having a pH between 3.5 and 5.5 to produce an extract having a viscosity from about 60 centipoises to about 200 centipoises in a 1 percent aqueous dispersion at 98° F.

3. The method of making an Irish moss extract for suspending chocolate in unheated milk comprising the steps of selecting Irish moss having viscosity characteristics such that the Irish moss would provide an extract having a viscosity between about 300 centipoises and about 600 centipoises in a 1 percent aqueous dispersion at 98° F. when prepared by aqueous leaching, reducing the gel strength of said Irish moss below 50 by treating said Irish moss with a solution containing an amount of sodium ions greater than that provided by about .5 percent, by weight, of aqueous sodium chloride solution, extracting the Irish moss with a hot acid solution having a pH of between 3.5 and 5.5 for a time sufficient to reduce the viscosity of the resulting extract so as to produce an extract having a viscosity from about 60 centipoises to about 200 centipoises in a 1 percent aqueous dispersion at 98° F., separating the solution containing the extract from the Irish moss residue, and evaporating the moisture from the extract.

4. The method of making an Irish moss extract for suspending chocolate in unheated milk comprising the steps of selecting Irish moss having viscosity characteristics such that the Irish moss would provide an extract having a viscosity between about 300 centipoises and about 600 centipoises in a 1 percent aqueous dispersion at 98° F. when prepared by aqueous leaching, subjecting the Irish moss to a treatment reducing the gel strength below 50 by treating the Irish moss with a solution containing an amount of sodium ions greater than that provided by a .5 percent, by weight, aqueous sodium chloride solution, and then heating the Irish moss in an acid solution at about the boiling point of said solution, said solution having a pH of between about 3.5 about 5.5, until the viscosity of the resulting extract is from about 60 centipoises to about 200 centipoises in a 1 percent aqueous dispersion at 98° F.

References Cited in the file of this patent

UNITED STATES PATENTS

| | | |
|---|---|---|
| 349,760 | Stanford | Sept. 28, 1886 |
| 1,814,986 | Walsh | July 14, 1931 |
| 2,036,922 | Clark et al. | Apr. 7, 1936 |
| 2,516,023 | Siehrs | July 18, 1950 |
| 2,669,519 | Baker | Feb. 16, 1954 |

OTHER REFERENCES

The Annals of Applied Biology (British), vol. 7, 1921, pp. 352 to 362, article by Paul Haas and T. G. Hill On Carragheen, *Chondrus crispus*.